United States Patent [19]

Lienhard et al.

[11] 4,359,418
[45] Nov. 16, 1982

[54] AMINE SALTS OF AZO DYESTUFFS OF THE PYRIDONE SERIES

[75] Inventors: Paul Lienhard, Frenkendorf; Gert Hegar, Schönenbuch, both of Switzerland

[73] Assignee: Ciba-Geigy Corporation, Ardsley, N.Y.

[21] Appl. No.: 252,526

[22] Filed: Apr. 9, 1981

Related U.S. Application Data

[63] Continuation of Ser. No. 31,282, Apr. 18, 1979, abandoned.

[30] Foreign Application Priority Data

Mar. 12, 1979 [CH] Switzerland .................. 2327/79

[51] Int. Cl.³ ................. C09B 29/36; C07C 85/20
[52] U.S. Cl. ........................... 260/156; 564/487
[58] Field of Search ............................. 260/156

[56] References Cited

U.S. PATENT DOCUMENTS

| | | | |
|---|---|---|---|
| 3,956,263 | 5/1976 | Buehler et al. | 260/146 R |
| 3,979,378 | 9/1976 | Gnad et al. | 260/156 |
| 4,039,523 | 8/1977 | Hegar | 260/153 |

FOREIGN PATENT DOCUMENTS 2147192  3/1973  France ........................... 260/156

*Primary Examiner*—John Doll
*Attorney, Agent, or Firm*—Luther A. R. Hall

[57] ABSTRACT

Azo dyestuff sulfonic acid salts of the formula:

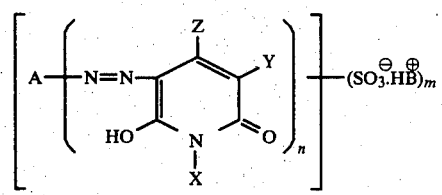

wherein A represents a carbocyclic or heterocyclic aromatic radical, B represents an aliphatic, cycloaliphatic or araliphatic amine, X represents a hydrogen atom or a substituted or unsubstituted alkyl group, a cycloalkyl, aralkyl or aryl group, Y represents a hydrogen or halogen atom, a nitro, cyano, acyl, sulfonic acid, arylsulfonyl, alkoxycarbonyl group or a substituted or unsubstituted alkyl, sulfamoyl or carbamoyl group, Z represents a substituted or unsubstituted alkyl group or an aryl radical, m and n are 1 or 2; said dyestuffs salts having good solubility in organic solvents and functioning to color solutions of film forming polymers in yellow to orange shades.

6 Claims, No Drawings

AMINE SALTS OF AZO DYESTUFFS OF THE PYRIDONE SERIES

This is a continuation of application Ser. No. 031,282, filed on Apr. 18, 1979, now abandoned.

The invention relates to azo dyestuff sulfonic acid salts of the formula:

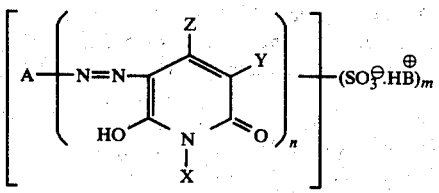

or of a tautomer thereof, wherein A represents a carbocyclic or heterocyclic aromatic radical, B represents an aliphatic, cycloaliphatic or araliphatic amine, X represents a hydrogen atom or a substituted or unsubstituted alkyl group, a cycloalkyl, aralkyl or aryl group, Y represents a hydrogen or halogen atom or an electrophilic group, for example a nitro, cyano, acyl, sulfonic acid, arylsulfonyl, alkoxycarbonyl group or a substituted or unsubstituted alkyl, sulfamoyl or carbamoyl group, Z represents a substituted or unsubstituted alkyl group or an aryl radical, and m and n are 1 or 2.

If n is 1, A represents a monovalent, preferably carbocyclic, aromatic radical, for example a naphthalene radical, but in particular a substituted phenyl radical. If n is 2, A represents a divalent radical, preferably a diphenyl, diphenyl ether or diphenylsulfonyl radical. An alkyl group X is preferably a $C_1$–$C_{18}$alkyl group which can be substituted, for example, by hydroxyl groups, alkoxy groups of 1 to 8 carbon atoms or by phenyl groups which are unsubstituted or substituted by chlorine, methyl or —$SO_3H$. If n is 1, the alkyl group can also be a radical of the formula:

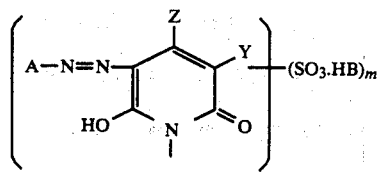

A cycloalkyl group X is in particular cyclohexyl. An aralkyl group X is in particular a phenylalkyl group containing 1 to 4 carbon atoms in the alkyl moiety. An aryl group X is preferably phenyl which is unsubstituted or substituted by chlorine, methyl or —$SO_3H$. An alkyl group Y is preferably a $C_1$–$C_6$alkyl group which can be substituted, for example, by a sulfonic acid group or an alkanoylamino group of 2 to 7 carbon atoms. An acyl group Y is preferably an alkanoyl group of 2 to 7 carbon atoms or a benzoyl group. Carbamoyl or sulfamoyl represented by Y can be unsubstituted or substituted by one or two $C_1$–$C_6$alkyl groups or a phenyl radical which is unsubstituted or substituted by chlorine atoms or methyl groups. An alkoxycarbonyl group Y preferably contains 2 to 7 carbon atoms. As an arylsulfonyl group, Y is preferably a phenylsulfonyl group. An alkyl group Z preferably contains 1 to 6 carbon atoms and can be substituted by a sulfonic acid group or a phenyl radical. As an aryl radical, Z is preferably a phenyl radical which can be substituted by chlorine, methyl or $C_1$–$C_6$alkoxy. The —$SO_3.HB$ group or groups are preferably in the radical A and $A_1$.

Preferred dye salts are those of the formula:

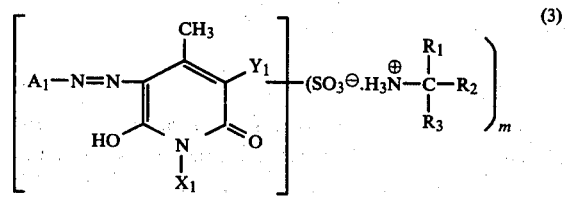

wherein $A_1$ represents a phenyl radical which can be substituted by halogen atoms, methyl, nitro or sulfonic acid groups, alkoxy groups of 1 to 6 carbon atoms, alkoxycarbonyl groups of 2 to 7 carbon atoms, or phenoxy, phenylazo or phenylsulfonyl groups which are unsubstituted or substituted by halogen atoms, methyl or sulfonic acid groups, or by a naphthalene radical which contains 1 to 2 sulfonic acid groups, $R_1$, $R_2$ and $R_3$ represent alkyl radicals containing together 7 to 24 carbon atoms, $X_1$ represents a hydrogen atom, an alkyl, hydroxyalkyl, alkoxyalkyl or cyanoalkyl group of 1 to 18 carbon atoms, a cycloalkyl group of 6 to 10 carbon atoms, an aralkyl group of 7 to 10 carbon atoms or a phenyl group which is unsubstituted or substituted by halogen atoms, alkyl or alkoxy groups of 1 to 6 carbon atoms, $Y_1$ represents a hydrogen atom, a cyano or sulfomethyl group, an alkoxycarbonyl group of 2 to 6 carbon atoms or a group of the formula —$CONR_4R_5$, wherein $R_4$ and $R_5$ represent hydrogen atoms or alkyl groups of 1 to 6 carbon atoms and m is 1 or 2, and, in particular, those of the formula (3) wherein $A_1$ represents a radical of the formula:

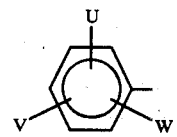

wherein U represents a chlorine atom, a methyl, nitro or sulfonic acid group, an alkoxy group of 1 to 4 carbon atoms, an alkoxycarbonyl group of 2 to 5 carbon atoms, V represents a hydrogen atom or a sulfonic acid group, and W represents a hydrogen atom, a methyl group or an alkoxy group of 1 to 4 carbon atoms.

The dye salts of the present invention are obtained by reacting the corresponding azo dyestuff monosulfonic or disulfonic acid with 1 or 2 moles respectively of the amine B.

The azo dyestuff sulfonic acids are known compounds which are described, for example, in the following publications:

German Offenlegungsschriften Nos.: 1 924 570, 2 004 487, 2 050 901, 2 134 453, 2 150 817, 2 237 006, 2 533 723, 1 930 491, 2 004 488, 2 115 449, 2 141 449, 2 162 612, 2 238 795, 2 545 828, 1 956 142, 2 033 281, 2 123 061, 2 141 453, 2 216 206, 2 349 709, 2 701 290

British patent specification Nos.: 1 296 857, 1 331 261, 1 345 864.

The azo dyestuff sulfonic acids are obtained by coupling a diazotised or tetraazotised carbocyclic or heterocyclic aromatic amine with a pyridone of the formula:

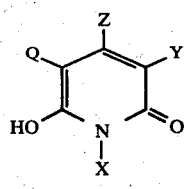 (5)

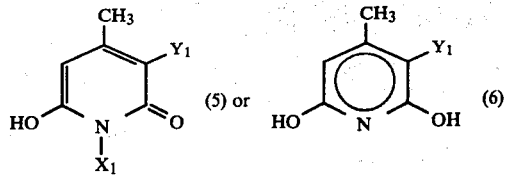

or of a tautomer thereof, wherein Q represents a hydrogen atom or an easily removable radical, for example the carbamoyl group and X, Y and Z have the given meanings, the components being so chosen that the resulting azo dye contains at least one sulfonic acid group.

As amines there are preferably used aminobenzenes, in particular those of the formula:

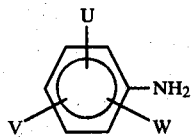 (6)

wherein U, V and W have the given meanings.

Examples of such amines are:
aniline
2-, 3- or 4-nitroaniline
2-, 3- or 4-chloroaniline
2- or 4-methylaniline
2- or 4-methoxyaniline
methyl anthranilate
ethyl anthranilate
aniline-2-, 3- or 4-sulfonic acid
aniline-2,4-disulfonic acid
aniline-2,5-disulfonic acid
2-nitroaniline-4-sulfonic acid
4-nitroaniline-2-sulfonic acid
2-nitro-6-methoxyaniline-4-sulfonic acid
4-nitro-2-methoxyaniline-6-sulfonic acid
4-methylaniline-2-sulfonic acid
2-methylaniline-4-sulfonic acid
2-chloroaniline-5-sulfonic acid
4-chloroaniline-3-sulfonic acid
2-amino-4,4'-dichloro-diphenyloxide-2'-sulfonic acid
2-amino-3'-sulfo-diphenylsulfonic acid
4-amino-4'-nitrostilbene-2,2'-disulfonic acid
4-aminoazobenzene
4-aminoazobenzene-4'-sulfonic acid
4-aminoazobenzene-3,4'-disulfonic acid
1-aminonaphthalene
1-aminonaphthalene-4,5,6,7- or 8-sulfonic acid
2-aminonaphthalene-1,5- or 6-sulfonic acid
1-aminonaphthalene-3,6-disulfonic acid
2-aminonaphthalene-1,5-, 3,6-, 4,8-, 5,7- or 6,8-disulfonic acid
1-amino-4-phenylazonaphthalene-3'-sulfonic acid
3,3'-dichloro-4,4'-diaminodiphenyl
4,4'-diamino-diphenylsulfone.

The pyridones used as coupling components preferably have the formula:

wherein $X_1$ and $Y_1$ have the above meanings. A great number of such pyridones are described in the literature, for example in British patent specification No. 1,296,857.

The following coupling components are particularly suitable for obtaining the dyes of the present invention:
2,6-dihydroxy-4-methylpyridine
2,6-dihydroxy-5-cyano-4-methylpyridine
2,6-dihydroxy-5-sulfo-4-methylpyridine
2,6-dihydroxy-5-cyano-4-ethylpyridine
1,4-dimethyl-2-hydroxy-5-cyano-pyridone-6
1-ethyl-2-hydroxy-4-phenyl-5-cyano-pyridone-6
1-ethyl-2-hydroxy-4-methyl-5-cyano-pyridone-6
1-ethyl-2-hydroxy-4-methyl-pyridone-6
1-isopropyl-2-hydroxy-4-methyl-5-cyano-pyridone-6
1-n-butyl-2-hydroxy-4-methyl-5-cyano-pyridone-6
1-n-octyl-2-hydroxy-4-methyl-5-cyano-pyridone-6
1-n-octadecyl-2-hydroxy-4-methyl-5-cyano-pyridone-6
1-benzyl-2-hydroxy-4-methyl-5-cyano-pyridone-6
1-3'-sulfobenzyl-2-hydroxy-4-methyl-5-cyano-pyridone-6
1-cyclohexyl-2-hydroxy-4-methyl-5-cyano-pyridone-6
1-phenyl-2-hydroxy-4-methyl-5-cyano-pyridone-6
1-p-toluyl-2-hydroxy-4-methyl-5-cyano-pyridone-6
1-hydroxyethyl-2-hydroxy-4-methyl-5-cyano-pyridone-6
1-cyanoethyl-2-hydroxy-4-methyl-5-cyano-pyridone-6
1-methoxyethyl-2-hydroxy-4-methyl-5-cyano-pyridone-6
1-methoxypropyl-2-hydroxy-4-methyl-5-cyano-pyridone-6
1-isopropoxypropyl-2-hydroxy-4-methyl-5-cyano-pyridone-6
1-methoxycarbonylethyl-2-hydroxy-4-methyl-5-cyano-pyridone-6
1-ethoxycarbonylmethyl-2-hydroxy-4-methyl-5-cyano-pyridone-6
1-phenoxycarbonylethyl-2-hydroxy-4-methyl-5-cyano-pyridone-6
1-ethyl-2-hydroxy-4-methyl-5-ethoxycarbonyl-pyridone-6
1-ethyl-2-hydroxy-4-methyl-5-carbamoyl-pyridone-6
1-ethyl-2-hydroxy-4-methyl-5-sulfomethyl-pyridone-6
1-ethyl2-hydroxy-4-methyl-5-dimethylcarbamoyl-pyridone-6
1-ethyl-2-hydroxy-4-methyl-5-di-n-butylcarbamoyl-pyridone-6
1-ethyl-2-hydroxy-4-methyl-5-nitro-pyridone-6
1-ethyl-2-hydroxy-4-methyl-5-chloro-pyridone-6
1-ethyl-2-hydroxy-4-methyl-5-sulfo-pyridone-6
1-ethyl-2-hydroxy-4-methyl-5-acetylaminomethyl-pyridone-6
1-ethyl-2-hydroxy-4-methyl-5-acetyl-pyridone-6
1-ethyl-2-hydroxy-4-sulfomethyl-5-cyano-pyridone-6
1-ethyl-2-hydroxy-4-sulfomethyl-5-carbamoyl-pyridone-6
1-ethyl-2-hydroxy-4-phenyl-5-cyano-pyridone-6

1,2-bis-(2'-hydroxy-4'-methyl-5'-cyano-pyridone-6'-yl-1')-ethane
1,6-bis-(2'-hydroxy-4'-methyl-5'-cyano-pyridone-6'-yl-1')-hexane
1-ethyl-2-hydroxy-4,5-dimethyl-pyridone-6
1-ethyl-2-hydroxy-4-methyl-5-phenylsulfonyl-pyridone-6
1-ethyl-2-hydroxy-4-methyl-5-N,N-dimethylsulfamoyl-pyridone-6

The diazotosation is carried out in the usual manner with nitrite in a mineral acid solution. The coupling is advantageously carried out in a weakly acid to weakly alkaline medium. The azo dyes can be precipitated by salting them out and removed by filtration or they can be converted direct by addition of the amine into the amine salt, which is only poorly soluble in water and can be isolated by filtration.

Suitable amines are lower aliphatic, araliphatic or cycloaliphatic amines, for example methylamine, trimethylamine, ethylamine, diethylamine, triethylamine, propylamine, isopropylamine, 2-isopropoxy-n-propylamine, n-butylamine, isobutylamine, ethyl-n-butylamine, pentylamines, n-hexylamine, cyclohexylamine, N-methyl-cyclohexylamine or benzylamine. Preferred amines, however, are aliphatic or cycloaliphatic amines containing at least 7 carbon atoms, for example octylamines, tri-n-butylamine, tri-(2-ethylhexyl) amine, 3-(2'-ethylhexoxy)propylamine-1, dicyclohexylamine, dehydroabietylamine, stearylamine, the reaction product of 1 mole of stearylamine and 50 moles of ethylene oxide, and especially the products obtainable under the trade names Primene 81-R and Primene JM-T of Rohm & Haas. These products are a mixture of amines of the formula:

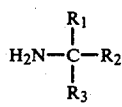

wherein $R_1$, $R_2$ and $R_3$ represent alkyl radicals containing together 12-14 (Primene 81-R) and 18-22 carbon atoms (Primene JM-T).

Preferred amines are also those of the formula:

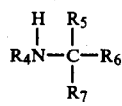

wherein $R_4$ represents hydrogen, an alkyl radical of 1 to 4 carbon atoms, an alkoxyalkyl radical of 3 to 6 carbon atoms or a cyclohexyl radical, $R_5$ represents hydrogen or the methyl group, $R_6$ represents a saturated or unsaturated hydrocarbon radical of 8 carbon atoms, and $R_7$ represents an alkyl radical of 2 to 10 carbon atoms, an alkoxyalkyl radical of 2 to 4 carbon atoms or a cycloalkyl radical.

Examples of such amines are: 3-amino-2-methyl-undecane, 4-cyclohexylamino-dodecane, 3-methylamino-2-methyl-undecane, 1-(2'-propylamino)-1-cyclohexyl-nonane, 4-(1'-butylamino)-dodecane, 4-(1'-butylamino)-6,9,11-dodecatriene, 4-(1'-propylamino)-6,9,11-dodecatriene, 3-amino-2-methyl-5,10-undecadiene, 2-(2'-propylamino)-1-methoxy-2-methyl-decane, 1-amino-10-methyl-1-phenyl-undecane, 9-amino-octadecane, 1-amino-1-cyclohexyl-nonane, 3-(3'-methoxy-1'-propylamino)-2-methyl-undecane.

Preferred amines are also those of the formula:

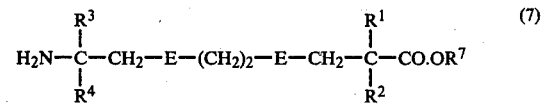

wherein each of $R^1$ and $R^3$ independently represents hydrogen or a straight chain or branched alkyl radical of 1 to 8 carbon atoms, $R^2$ represents a straight chain or branched alkyl radical of 1 to 8 carbon atoms and $R^4$ represents a straight chain or branched alkyl radical of 1 to 18 carbon atoms, or $R^1$ and $R^2$ and/or $R^3$ and $R^4$ together with the carbon atom to which they are attached form a cycloaliphatic ring containing 4 to 8 carbon atoms, and wherein each E represents one of the radicals:

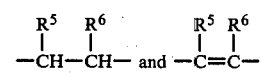

in which each of $R^5$ and $R^6$ independently represents hydrogen or alkyl of 1 to 4 carbon atoms and $R^7$ represents a straight chain or branched alkyl radical containing altogether 1 to 18 carbon atoms, and, in particular, those wherein E represents the radical:

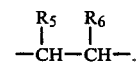

Examples of such amines are: methyl 11-amino-2,2-dimethyl-tridecanoate (b.p. 78°–80° C./0.05 torr, $n_D^{20} = 1.4494$; n-pentyl 11-amino-2,2-dimethyl-tridecanoate (b.p. 126°–128° C./0.02 torr, $n_D^{20} = 1.4494$; isopropyl 11-amino-2,2-dimethyl-tridecanoate (b.p. 95° C./0.01 torr, $n_D^{20} = 1.4469$); methyl 11-amino-2,2,12-trimethyl tridecanoate (b.p. 106°–107° C./0.03 torr, $n_D^{20} = 1.4511$); n-pentyl 11-amino-2,2,12-trimethyl-tridecanoate (b.p. 138°–139° C./0.01 torr, $n_D^{20} = 1.4505$); methyl 11-amino-trideca-4,8-dienate (b.p. 106°–108° C./0.3 bar, $n_D^{20} = 1.4754$).

The compounds of the formula (7) are obtained by reacting a 1-azacyclododecene of the formula (8):

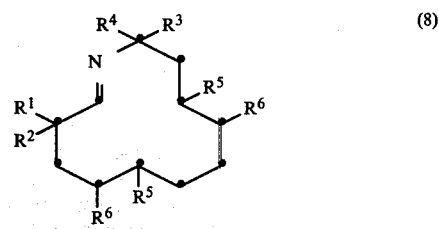

or a 1-aza-1,5,9-cyclododecatriene of the formula:

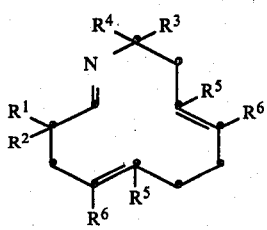

(9)

in aqueous or aqueous-organic medium, in the presence of an inorganic acid, by methods known per se, to produce compounds of the formula:

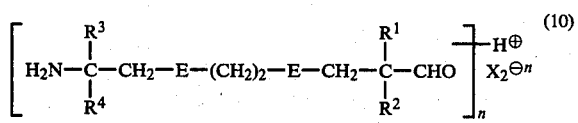

(10)

in which formulae (8) to (10), $R_1$ to $R_6$ and E are as defined for formula (7), X is the anion of the inorganic acid and n is an integer corresponding to the valency of $X_2$, and subsequently oxidising the compounds of the formula (10) to the respective 11-amino-undecanoic acids or 11-amino-undeca-4,8-dienoic acids, and, in a third reaction step, reacting these acids by known methods with an alcohol of the formula $R^7OH$, wherein $R^7$ represents a straight chain or branched alkyl radical of altogether 1 to 18 carbon atoms, to produce the corresponding esters of the formula (7).

The salt formation is advantageously carried out by reacting a solution or suspension of an alkali metal salt of the dyestuff sulfonic acid with the aqueous solution of a water-soluble salt of the amine, preferably one with a lower fatty acid, in particular formic acid or acetic acid. It is advantageous to carry out this reaction at temperatures between 40° and 80° C. and at a pH value below 7.

As the dye salts are insoluble in the aqueous reaction medium, they can be isolated by filtration.

The reaction can also be carried out, however, in organic solvents alone or in mixtures thereof with water. A preferred embodiment consists in adding the solution of the amine in an organic solvent of only limited water-solubility to an aqueous solution or suspension of an alkali metal salt of the dyestuff sulfonic acid, acidifying the resulting mixture with an inorganic or organic acid and mixing it thoroughly, whereupon the amine salt of the dyestuff sulfonic acid passes into the organic phase and can be isolated, after separating the layers, by evaporating off the solvent. The reaction in the two-phase system is carried out at temperatures between 10° C. and the boiling point of the solvent/water mixture. As organic solvents there are preferably used chlorinated hydrocarbons, such as methylene chloride, chloroform or chlorobenzene, ethers, such as diisopropyl or dioctyl ether, ketones, such as methyl isobutyl ketone or diisopropyl ketone, esters, such as ethyl acetate, butyl acetate or tert-butylpropionate, or alcohols, such as n-butanol, iso- or tert-amyl alcohol.

The new dye salts have excellent solubility in alcohols, especially in lower alkanols, such as methanol, ethanol, n-propanol or isopropanol, in alkylene glycol monoalkyl ethers, for example in ethylene glycol monomethyl or monoethyl ether, in alkylene glycols, for example in propylene glycols, or in araliphatic alcohols, for example in benzyl alcohol, or in mixtures of such alcohols, in lower aliphatic ketones, for example acetone, methyl ethyl ketone, methyl isobutyl ketone or also in cyclohexanone, in carboxylic acid esters, for example methyl acetate, ethyl acetate, butyl acetate or glycol monoacetate, and also in halogenated hydrocarbons, preferably lower aliphatic hydrocarbons, such as chloroform, methylene chloride, ethylene chloride or carbon tetrachloride.

Because of their good solubility in the abovementioned ketones, especially acetone, the dye salts of the present invention are suitable for the spin-dyeing of cellulose 2½-acetate; and because of their good solubility in halogenated lower aliphatic hydrocarbons, especially chloroform, and methylene chloride/methanol (9:1), they can also be used for the spin dyeing of cellulose triacetate. The spin-dyed fabric is distinguished by purity and depth of shade, by excellent distribution of the colourant, and by very good fastness properties, such as fastness to washing, water, bleaching, cross-dyeing, dry-cleaning, rubbing, ironing, dry heat and light.

On account of their good solubility in alcohols, esters and mixtures thereof, the dye salts of the invention are particularly suitable for colouring film-forming polymers.

By alcoholic and/or ester-containing solutions of film-forming polymers are meant in this context in particular those liquid vehicles which are suitable for use in printing inks for flexographic printing. As polymers, these solutions contain, for example, neutral resins such as shellac or Manila copal, or cellulose derivatives, for example cellulose ethers, such as ethylcellulose or cellulose esters, such as nitrocellulose; and also maleate resins or phenol-formaldehyde resins which are preferably modified with colophonium, such as the products described in U.S. Pat. No. 2,347,923; polyamide resins, i.e. polycondensation products of polyamines with polycarboxy compounds, which are described, for example, in U.S. Pat. No. 2,663,649; further urea-formaldehyde and melamine-formaldehyde condensation products, ketone-formaldehyde condensation products, polyvinyl acetates or polyacrylic acid resins, for example polybutyl acrylate resin, or their mixtures; polycondensation products of polyvalent alcohols, such as glycerol or pentaerythritol, with polybasic acids, such as maleic acid or phthalic acid alone or in combination with unsaturated fatty acids, such as those of linseed oil and castor oil.

In addition, the solutions of film-forming polymers can contain conventional assistants employed in the lacquer sector, such as wetting agents, for example higher fatty acid bis-hydroxy-alkylamides, such as coconut oil fatty acid bis-($\beta$-hydroxyethyl)amide, plasticisers, for example phthalates, and further ingredients, such as silicone oils.

These solutions of film-forming polymers containing dye salts of the invention are suitable, for example, for printing a variety of materials, such as metal foils, for example aluminium foils, paper, glass, synthetic resin sheets and films and the like. They are also suitable for coating a wide variety of surfaces, e.g. of metal parts, plastic mouldings or wooden boards. They are storable and provide level, strong and water-resistant coatings on the above materials.

Compared with the starting materials of the dye salts of the present invention, for example with the alkali salts described in British patent specification No. 1 296

857, the dye salts of the invention possess the advantage of greater solubility in organic solvents.

EXAMPLE 1

38.4 g (0.1 mole) of the monazo dye of the formula:

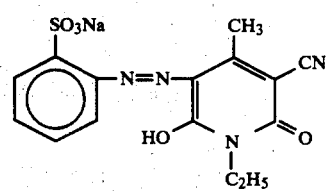

are suspended in 1000 ml of warm water of 40° C. A solution of 19.5 g (0.1 mole) of Primene 81-R (Rohm & Haas) in 200 ml of water and 6 ml of 85% formic acid is added dropwise to the above homogeneous suspension. The reaction mixture is acidified by the addition of further formic acid (litmus paper test) and stirred for several hours at 40°–45° C. The dye salt is then removed by filtration, washed thoroughly with water and dried in vacuo at 80°–90° C., affording 53 g of a yellow powder which dissolves very readily in lower alcohols and ketones.

EXAMPLES 2 TO 6

Similar dye salts also having good solubilities are obtained by repeating the procedure of Example 1, but using 0.1 mole of one of the amines listed in Table 1 instead of Primene 81-R.

TABLE 1

| Example | Amine |
| --- | --- |
| 2 | tri-(n-dodecyl)-amine |
| 3 | 3-amino-3,7-dimethyloctane |
| 4 | isododecylamine (isomer mixture) |
| 5 | Primene JM-T |

TABLE 1-continued

| Example | Amine |
| --- | --- |
| 6 | dehydroabietylamine |

EXAMPLE 7

48.6 g (0.1 mole) of the sodium salt of the monoazo dye obtained by coupling aniline-2,4-disulfonic acid to 1-ethyl-2-hydroxy-4-methyl-5-cyano-pyridone-5 are stirred in 300 ml of water and 300 ml of methyl isobutyl ketone. Then 38.8 g (0.2 mole) of Primene 81-R (Rohm & Haas) and formic acid are added to the above mixture dropwise until a pH value of 3.5–4 is attained. The reaction mixture is stirred for 1 hour at 40°–45° C., both phases are separated and the organic phase is washed with 250 ml of water. The solvent is distilled off and the residue is dried in vacuo at elevated temperature, affording 68 g of yellow dye salt which is very readily soluble in the solvents customarily employed in the printing ink and lacquer sector, for example in acetone, methanol, ethanol, isopropanol, n-butanol, benzyl alcohol, ethylene glycol monomethyl and monoethyl ether, and in solvent mixtures, such as ethanol/toluene (70:30), ethanol/ethylene glycol monoethyl ether (85:15), ethanol/ethyl acetate (50:50), methylene chloride/methanol (9:1). The printing inks, coloured lacquers and acetate fibres obtained therewith are distinguished by a pure, yellow shade.

EXAMPLES 8 TO 26

Table 2 lists further dye salts which are obtained by diazotising the amine of column II with the pyridone of column III and reacting the sodium salt of the resulting azo dyestuff sulfonic acid with the amine of column IV according to the procedure of Example 7. Column V indicates the shade of the printing inks obtained with the dye salt.

TABLE 2

| Example | Diazo component | Coupling component | Amine | Shade |
| --- | --- | --- | --- | --- |
| 8 | aniline-2,4-disulfonic acid | 1-ethyl-2-hydroxy-4-methyl-5-cyano-pyridone-6 | Primene JM-T | yellow |
| 9 | aniline-2,4-disulfonic acid | 1-ethyl-2-hydroxy-4-methyl-5-cyano-pyridone-6 | dehydroabietylamine | " |
| 10 | aniline-2,4-disulfonic acid | 1-ethyl-2-hydroxy-4-methyl-5-cyano-pyridone-6 | 3-(2'-ethylhexoxy)-propylamine | " |
| 11 | aniline-2,4-disulfonic acid | 1-ethyl-2-hydroxy-4-methyl-5-cyano-pyridone-6 | dicyclohexylamine | " |
| 12 | aniline-2,4-disulfonic acid | 2,6-dihydroxy-4-methyl-5-cyano-pyridine | Primene 81-R | " |
| 13 | aniline-2,4-disulfonic acid | 2,6-dihydroxy-4-methyl-5-cyano-pyridine | Primene JM-T | " |
| 14 | aniline-2,5-disulfonic acid | 2,6-dihydroxy-4-methyl-5-cyano-pyridine | Primene 81-R | " |
| 15 | aniline-2,5-disulfonic acid | 2,6-dihydroxy-4-methyl-5-cyano-pyridine | Primene JM-T | " |
| 16 | aniline-2,5-disulfonic acid | 1-ethyl-2-hydroxy-4-methyl-5-cyano-pyridone-6 | Primene 81-R | " |
| 17 | aniline-2,5-disulfonic acid | 1-ethyl-2-hydroxy-4-methyl-5-cyano-pyridone-6 | Primene JM-T | " |
| 18 | aniline-2,5-disulfonic acid | 1-ethyl-2-hydroxy-4-methyl-5-cyano-pyridone-6 | dicyclohexylamine | " |
| 19 | aniline-2,5-disulfonic acid | 1-ethyl-2-hydroxy-4-methyl-5-cyano-pyridone-6 | dehydroabietylamine | " |
| 20 | aniline-2,5-disulfonic acid | 1-ethyl-2-hydroxy-4-methyl-5-cyano-pyridone-6 | 3-(2'-ethylhexoxy)-propylamine-1 | " |
| 21 | 2-aminonaphthalene-6,8-disulfonic acid | 1-ethyl-2-hydroxy-4-methyl-5-cyano-pyridone-6 | Primene 81-R | yellowish orange |
| 22 | 1-aminonaphthalene-3,6-disulfonic acid | 1-ethyl-2-hydroxy-4-methyl-5-cyano-pyridone-6 | Primene 81-R | yellowish orange |
| 23 | 4-amino-4'-nitrostilbene-2,2'-disulfonic acid | 1-ethyl-2-hydroxy-4-methyl-5-cyano-pyridone-6 | Primene 81-R | orange |
| 24 | aniline-2-sulfonic acid | 1-ethyl-2-hydroxy-4-methyl- | Primene 81-R | yellow |

TABLE 2-continued

| Example | Diazo component | Coupling component | Amine | Shade |
|---|---|---|---|---|
| 25 | aniline-2,5-disulfonic acid | 5-sulfomethyl-pyridone-6 2,6-dihydroxy-4-methyl-pyridine | dehydroabietyl-amine | " |
| 26 | aniline-2,5-disulfonic acid | 1-ethyl-2-hydroxy-4-methyl-pyridone-6 | dehydroabietyl-amine | " |

EXAMPLE 27

Column V indicates the shade of the printing ink obtained with the dye salt.

TABLE 3

| Example | Diazo component | Coupling component | Amine | Shade |
|---|---|---|---|---|
| 28 | sulfanilic acid | 1-ethyl-2-hydroxy-4-methyl-5-cyano-pyridone-6 | reaction product of 1 mole of stearyl-amine with 5 moles of ethylene oxide | yellow |
| 29 | 2-nitroaniline | 1-ethyl-2-hydroxy-4-sulfomethyl-5-carbamoyl-pyridone-6 | Primene 81-R | " |
| 30 | 2-nitroaniline | 1-ethyl-2-hydroxy-4-methyl-5-sulfomethyl-pyridone-6 | Primene 81-R | " |
| 31 | 2-nitroaniline | 1-ethyl-2-hydroxy-4-methyl-5-sulfo-pyridone-6 | Primene 81-R | " |
| 32 | 2-nitroaniline-4-sulfonic acid | 1-ethyl-2-hydroxy-4-methyl-5-cyano-pyridone-6 | Primene 81-R | " |
| 33 | 2-nitro-6-methoxy-aniline-4-sulfonic acid | 1-ethyl-2-hydroxy-4-methyl-5-cyano-pyridone-6 | Primene 81-R | reddish yellow |
| 34 | 2-methoxy-4-nitro-aniline-6-sulfonic acid | 2,6-dihydroxy-4-methyl-5-cyano-pyridine | Primene 81-R | reddish yellow |
| 35 | 2-methoxy-4-nitro-aniline-6-sulfonic acid | 2,6-dihydroxy-4-methyl-5-cyano-pyridine | Primene JM-T | reddish yellow |
| 36 | aniline-3-sulfonic acid | 2,6-dihydroxy-4-methyl-5-cyano-pyridine | Primene JM-T | yellow |
| 37 | aniline-3-sulfonic acid | 1-ethyl-2-hydroxy-4-methyl-5-cyano-pyridone-6 | Primene JM-T | " |
| 38 | sulfanilic acid | 1-n-butyl-2-hydroxy-4-methyl-5-cyano-pyridone-6 | Primene 81-R | " |
| 39 | sulfanilic acid | 1-n-octyl-2-hydroxy-4-methyl-5-cyano-pyridone-6 | dicyclohexylamine | " |
| 40 | sulfanilic acid | 1-benzyl-2-hydroxy-4-methyl-5-cyano-pyridone-6 | Primene 81-R | yellow |
| 41 | aniline-2-sulfonic acid | 1-ethyl-2-hydroxy-4-methyl-5-di-n-butylcarbamoyl-pyridone-6 | Primene 81-R | " |

40.1 g (0.1 mole) of the potassium salt of the monazo dye obtained by coupling sulfanilic acid to 1-ethyl-2-hydroxy-4-methyl-5-cyano-pyridone-6 are suspended in 1200 ml of water. A solution of 32.8 g (0.1 mole) of prime JM-T (Rohm & Haas, average molecular weight 297, content from acid titration 90.5%) in 250 ml of water and 7 ml of 85% formic acid are added dropwise to the above suspension at room temperature. Further formic acid is then added to the reaction mixture until the pH is between 4 and 4.5, then 750 ml of butanol are added and the mixture is stirred until the dye salt has dissolved in the butanol. The butanol phase is separated in a separating funnel, washed twice with water and concentrated. The residue is finally dried in vacuo, affording 67 g of a yellowish brown product which can be powdered. This product is very readily soluble in ethanol, acetone, ethyl acetate and in the solvent mixture methylene chloride/methanol (9:1). Lacquer formulations which contain the dye salt, solvent and nitrocellulose or acetyl cellulose or an alkyd/melamine resin, produce very strong, yellow colourations on paper or metal surfaces. Tabel 3 lists further dye salts which are obtained by diazotising the amine of column II with the pyridone of column III and reacting the alkali salt of the resulting azo dyestuff sulfonic acid with the amine of column IV by the procedure described in Example 27.

EXAMPLE 42

54.5 g (0.1 mole) of the sodium salt of the azo dye obtained by coupling diazotised 2-amino-4,4'-dichloro-diphenyl oxide to 1-alkyl-2-hydroxy-4-methyl-5-cyano-pyridone-6 are suspended in 1000 ml of water and the suspension is stirred for 1 hour. Then a solution of 19.4 g (0.1 mole) of Primene 81-R in 200 ml of water and 6 ml of 85% formic acid are added dropwise. The reaction mixture is acidified by adding further formic acid (litmus paper test), then strirred for several hours at room temperature. The dye salt is converted by gentle heating into an easily filterable form and collected by filtration. The product is washed firstly with dilute formic acid and then thoroughly with water and dried in vacuo, affording 66 g of a brown powder which is readily soluble in ethanol, acetone and ethyl acetate, and which produces reddish yellow lacquers and printing inks.

EXAMPLES 43 TO 67

Table 4 lists further dye salts which are obtained by diazotising or tetraazotising the amine of column II with the pyridone of column III and reacting the sodium salt of the resulting azo dyestuff sulfonic acid with the amine of column IV by the method of Example 42. Column V indicates the shade of the printing ink obtained with the dye salt.

TABLE 4

| Example | Diazo component | Coupling component | Amine | Shade |
|---|---|---|---|---|
| 43 | 4-nitroaniline-2-sulfonic acid | 2,6-dihydroxy-4-methyl-5-cyano-pyridine | Primene 81-R | yellow |
| 44 | aniline-2-sulfonic acid | 2,6-dihydroxy-4-methyl-5-cyano-pyridine | Primene 81-R | " |
| 45 | aniline-2-sulfonic acid | 2,6-dihydroxy-4-methyl-5-cyano-pyridine | Primene JM-T | " |
| 46 | aniline-3-sulfonic acid | 1-ethyl-2-hydroxy-4-methyl-5-cyano-pyridone-6 | Primene 81-R | " |
| 47 | 2-chloroaniline-5-sulfonic acid | 1-ethyl-2-hydroxy-4-methyl-5-cyano-pyridone-6 | Primene 81-R | " |
| 48 | aniline-3-sulfonic acid | 2,6-dihydroxy-4-methyl-5-cyano-pyridine | Primene 81-R | " |
| 49 | aniline-3-sulfonic acid | 2,6-dihydroxy-4-methyl-5-cyano-pyridine | dehydroabietylamine | " |
| 50 | 4-methyl-aniline-2-sulfonic acid | 1-ethyl-2-hydroxy-4-methyl-5-cyano-pyridone-6 | Primene 81-R | " |
| 51 | 2-nitroaniline | 1-ethyl-2-hydroxy-4-sulfomethyl-5-cyano-pyridone-6 | Primene 81-R | reddish yellow |
| 52 | sulfanilic acid | 1-ethyl-2-hydroxy-4-phenyl-5-cyano-pyridone-6 | Primene 81-R | yellow |
| 53 | sulfanilic acid | 1-ethyl-2-hydroxy-4-methyl-5-dimethylcarbamoyl-pyridone-6 | Primene 81-R | " |
| 54 | 4-methylaniline-2-sulfonic acid | 1-ethyl-2-hydroxy-4-methyl-5-ethoxycarbonyl-pyridone-6 | Primene 81-R | " |
| 55 | 2-chloroaniline-5-sulfonic acid | 1-$\beta$-hydroxyethyl-2-hydroxy-4-methyl-5-cyano-pyridone-6 | Primene 81-R | " |
| 56 | ethyl anthranilate | 2,6-dihydroxy-4-methyl-5-sulfopyridine | Primene 81-R | " |
| 57 | sulfanilic acid | 1-ethyl-2-hydroxy-4-methyl-5-carbamoyl-pyridone-6 | Primene JM-T | " |
| 58 | aniline-3-sulfonic acid | 1-ethyl-2-hydroxy-4-methyl-5-nitropyridone-6 | Primene 81-R | " |
| 59 | sulfanilic acid | 1-phenyl-2-hydroxy-4-methyl-5-cyano-pyridone-6 | Primene 81-R | " |
| 60 | 1-aminonaphthalene-4-sulfonic acid | 1-ethyl-2-hydroxy-5-cyano-pyridone-6 | Primene 81-R | orange |
| 61 | 1-aminonaphthalene-6-sulfonic acid | 1-ethyl-2-hydroxy-5-cyano-pyridone-6 | Primene 81-R | " |
| 62 | 2-aminonaphthalene-6-sulfonic acid | 1-ethyl-2-hydroxy-5-cyano-pyridone-6 | Primene 81-R | reddish yellow |
| 63 | 4-amino-4'-sulfo-azobenzene | 1-ethyl-2-hydroxy-5-cyano-pyridone-6 | Primene 81-R | orange brown |
| 64 | 1-amino-4-(3'-sulfophenyl-azo)-naphthalene | 1-ethyl-2-hydroxy-5-cyano-pyridone-6 | Primene 81-R | claret |
| 65 | 4-amino-4'-nitrostilbene-2,2'-disulfonic acid | 1-ethyl-2-hydroxy-5-cyano-pyridone-6 | Primene 81-R | orange |
| 66 | aniline-3-sulfonic acid (2 moles) | bis-(2-hydroxy-4-methyl-5-cyano-pyridon-6-yl-1)ethane | Primene 81-R | yellow |
| 67 | 4,4'-diamino-diphenylsulfone | 1-ethyl-2-hydroxy-4-methyl-5-sulfomethyl-pyridone-6(2 moles) | Primene 81-R | " |

EXAMPLE 68

A suspension of 52.5 g (0.1 mole) of the sodium salt of the monoazo dye obtained by coupling diazotised 2-aminodiphenylsulfone-3'-sulfonic acid to 1-ethyl-2-hydroxy-4-methyl-5-cyano-pyridone-6 in 500 ml of water is introduced into an acid solution of 19.4 g (0.1 mole) of Primene 81-R (average molecular weight 185, content 95.4%) in 500 ml of water and hydrochloric acid. The reaction mixture is acidified with further hydrochloric acid and stirred for several hours at room temperature. The dye salt is then collected by filtration, washed with water and dried in vacuo. The product dissolves in ethanol, acetone and ethylene glycol monoethyl ether to give a yellow solution and produces strong colourations when applied in printing inks.

EXAMPLE 69

38.4 g (0.1 mole) of the sodium salt of the azo dye obtained by coupling diazotised 2-aminobenzenesulfonic acid to 1-ethyl-2-hydroxy-4-methyl-5-cyano-pyridone-6 are suspended in 1000 ml of warm water of 40° C. Then a mixture of 25.4 g (0.1 mole) of 3-(3'-methoxy-1'-propyl-amino)-2-methylundecane, 8 ml of 85% formic and 200 ml of water is added dropwise. The acid reaction mixture is stirred for several hours at 40°–45° C. and then filtered. The filter cake is washed firstly with dilute formic acid, then with water and dried in vacuo at 70°–80° C., affording 58 g of a yellow dye salt which is very readily soluble in ethanol, acetone, ethyl acetate and ethylene glycol monoethyl ether.

EXAMPLE 70

38.4 g (0.1 mole) of this sodium salt of the azo dye obtained by coupling diazotised 2-aminobenzenesulfonic acid to 1-ethyl-2-hydroxy-4-methyl-5-cyano-pyridone-6 are suspended in 1000 ml of water. A mixture of 18.1 g (0.1 mole) of 3-amino-3-methyl-5,10-undecadiene, 8 ml of 85% formic acid and 200 ml of water is added to the above homogeneous suspension. The acid reaction mixture is stirred for several hours and then filtered. The filter cake is washed firstly with 1% formic acid and then with water and dried in vacuo at 50°–60° C., affording 48 g of a yellow product which is very readily soluble in ethanol, acetone and ethylene glycol monoethyl ether.

EXAMPLES 71 TO 82

Similar dye salts also having good solubilities are obtained by proceeding as described in the preceding Examples, but using 0.1 mole of one of the amines listed in the following table.

| Examples | Amine |
|---|---|
| 71 | 3-amino-2-methyl-undecane |
| 72 | 4-cyclohexylamino-dodecane |
| 73 | 3-methylamino-2-methyl-undecane |
| 74 | 1-(2'-propylamino)-1-cyclohexyl-nonane |
| 75 | 1-amino-1-cyclohexyl-nonane |
| 76 | 9-amino-octadecane |
| 77 | 4-(1'-butylamino)-dodecane |
| 78 | 4-(1'-butylamino)-6,9,11-dodecatriene |
| 79 | 4-(1'-propylamino)-6,9,11-dodecatriene |
| 80 | 3-methylamino-2-methyl-5-,10-undecadiene |
| 81 | 2-(2'-propylamino)-1-methyoxy-2-methyldecane |
| 82 | 1-amino-10-methyl-1-phenylundecane |

EXAMPLE 83

5 g of the dye salt obtained in Example 7 are added to 95 g of a nitrocellulose lacquer obtained from 15 g of alcohol-soluble, low viscosity nitrocellulose with about 18% of dibutyl phthalate, 10 g of ethylene glycol monoethyl ether, 20 g of ethyl acetate and 50 g of 94% ethanol. The mixture is stirred until the colourant is evenly distributed. The lacquer is then applied with a film applicator (handcoater of RK Chemical CO. Ltd., Royston, England) to a wet film thickness of about 12 μm to opaline paper or an aluminium lined foil and dried, producing a firmly adhering, uniform, strong yellow finish which has excellent resistance to exposure and treatment with water and butter.

EXAMPLE 84

5 g of the dye salt obtained in Example 7 are dissolved in 33 ml of ethanol, 34 ml of ethylene glycol monoethyl ether and 33 ml of desalinated water. The solution is clarified by means of a paper filter and then applied to a board of beech plywood. The solvent is evaporated and the board is then spray-coated with a combination lacquer prepared from 14.6 g of nitrocellulose with about 18% of dioctyl phthalate, 23 g of butyl acetate, 4 g of ethyl acetate, 8.5 g of butanol, 2 g of diacetone alcohol, 4 g of ethylene glycol monoethyl ether, 12.5 g of a non-drying alkyd resin (Duraplex ND 78 of Rohm & Haas) in the form of a 60% solution in xylene, 6 g of a melamine/formaldehyde precondensate (Cibamin M 96, Ciba-Geigy AG) in the form of a 75% solution in butanol, 3.4 g of dioctyl phthalate, 12.5 g of toluene and 9.5 g of xylene, and then dried once more. A strong, lightfast, yellow finish is obtained.

EXAMPLE 85

A two-layer finish on sheet aluminium is obtained in the following steps:

(a) Binder: 67.5 g of a non-drying alkyd resin in the form of a 60% solution in xylene (Alkydal F 27, marketed by Bayer), 26.4 g of a partially esterified melamine/formaldehyde precondensate in the form of a 55% solution in butanol/xylene 1:1 (Maprenal TTX, marketed by Cassella), 1.1 g of xylene, 4 g of ethylene glycol monoethyl ether and 1 g of a 1% solution of a silicone oil in xylene, are mixed to a homogeneous composition.

(b) 1st Layer: 5 g of a commercially available fine aluminium powder are suspended in 10 g of methyl ethyl ketone and 10 g of butyl acetate. Then 75 g of the binder described in (a) are added to the suspension. The resulting dispersion is adjusted to the processing viscosity with a solvent mixture of 60% of xylene, 20% of butanol and 20% of ethylene glycol monoethyl ether, and applied to an aluminium sheet.

(c) 2nd Layer: 1 g of the dye salt obtained in Example 7 is dissolved in 99 g of the binder described in (a) and the solution is adjusted to spray viscosity with the solvent mixture referred to in (b). The solution is applied to the pretreated aluminium sheet as second layer using a spray gun. The coloured coating is then finished by drying for 30 minutes and stoving at 130° C. A brilliant yellow finish of good lightfastness is obtained.

EXAMPLE 86

20 g of the dye salt of Example 7, 30 g of bleached wax-free shellac, 5 g of dibutyl phthalate and 45 g of ethanol are mixed. The resulting printing ink has a good shelf life and can be used as obtained or diluted with ethanol for flexographic printing on paper and aluminium foils. Brilliant and strong yellow prints of good adherence are obtained with this printing ink on the above materials.

EXAMPLE 87

10 g of the dye salt obtained in Example 2 are stirred into 90 g of a solution consisting of 25% of an alcohol-soluble polyamide resin modified with esters and prepared, for example, in accordance with Example 7 of U.S. patent specification 2,663,649, 2% of water, 5% of the petroleum fraction boiling at 80°–100° C., 48% of ethanol and 20% of isopropanol, to produce a printing ink which, in flexographic printing, colours cellophane in a yellow shade of good adherence and great purity.

EXAMPLE 88

1.3 g of the dye salt of Example 7 are sprinkled into a solution of acetyl cellulose in acetone with a solids content of 26%. Then 20 ml of acetone are added and the mixture is rolled in a well sealed bottle on a roller block until the dye is completely dissolved. The coloured spinning solution is then forced through jets. The filament obtained runs through a long heated tube and can then be spooled directly. The coloured material has a bright, yellow shade and has excellent fastness properties, especially excellent fastness to washing, water, bleaching, cross-dyeing, dry-cleaning, rubbing, ironing, dry heat and light.

EXAMPLES FOR THE MANUFACTURE OF COMPOUNDS OF THE FORMULA (7)

EXAMPLES 89

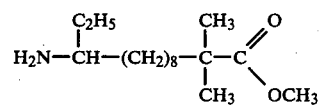

(a) With stirring, 975 g (4.37 moles) of 3,3-dimethyl-12-ethyl-1-azacyclododecene are added dropwise in the course of about 35 minutes to a solution of 450 g (4.6 moles) of sulfuric acid in 600 g of water. The clear, slightly yellowish solution is then treated with steam for 20 minutes in order to remove any aldehyde impurities.

The aqueous solution is subsequently stirred in an autoclave for 3 hours at 50° C. under an oxygen pressure of 20 bar. The acid reaction mixture is neutralised with sodium hydroxide solution, affording 820 g (3.2 moles) of 11-amino-2,2-dimethyltridecanoic acid, corresponding to a yield of 73% of theory. Melting point: 164°–165° C.

| Analysis for $C_{15}H_{31}NO_2$ | Molecular weight: 257,42) | | | |
|---|---|---|---|---|
| calculated: | C 69.99% | H 12.14% | N 5.44% | O 12.43% |
| found: | C 70.03% | H 12.10% | N 5.54% | — |
| MS spectrum: | molecular peak 257, fragment masses 228, 182, 140, 58. | | | |

(b) 51.4 g (0.2 mole) of 11-amino-2,2-dimethyltridecanoic acid and 200 ml of methanol and 22 g (0.224 mole) of sulfuric acid are refluxed for 3 hours. Excess methanol is then distilled off, the residue is diluted with about 200 ml of water and the reaction solution is made weakly alkaline (pH 8–10) with aqueous sodium hydroxide, whereupon the aminoacid ester separates as upper organic phase. Subsequent distillation yields 48.5 g (0.179 mole) of 11-amino-2-,2-dimethyl-tridecanoic acid methyl ester, corresponding to a yield of 89.5% of theory.

The further compounds of the formula (7) referred to in the description can be prepared by an entirely analogous procedure.

EXAMPLE 90

19.2 g (0.05 mole) of the monoazo dye obtained by coupling diazotised 2-aminobenzenesulfonic acid to 1-ethyl-2-hydroxy-4-methyl-5-cyano-pyridone-6 (sodium salt) are suspended in 500 ml of water. A mixture of 17.1 g (0.05 mole) of 11-amino-2,2,12-trimethyl-tridecanoic acid pentyl ester, 4 ml of 85% formic acid and 80 ml of water is then added dropwise to the above suspension. The suspension is stirred for several hours at 45°–50° C. and filtered. The filter cake is washed firstly with dilute formic acid and then with water and dried at 60° C. in vacuo. The yield of isolated solvent dye of the above formula is 35.7 g. The dye is very readily soluble in ethanol, acetone, ethyl acetate and ethylene glycol monoethyl ether.

Valuable yellow solvent dyes are also obtained in analogous manner by using the equivalent amount of one of the amines of formula (7) instead of the 0.05 mole of 11-amino-2,2,12-trimethyltridecanoic acid pentyl ester.

EXAMPLE 91

48.6 g (0.1 mole) of the sodium salt of the monoazo dye obtained by coupling diazotised aniline-2,4-disulfonic acid to 1-ethyl-2-hydroxy-4-methyl-5-cyanopyridone-6 are stirred in 300 ml of water and 300 ml of methyl isobutyl ketone. 68.4 g (0.2 mole) of 2,2-dimethyl-11-iso-propyl-11-amino-undecanoic acid pentyl ester and formic acid are added dropwise until a pH value of 3.5–4 is attained.

What is claimed is:

1. An azo dyestuff sulfonic acid salt of the formula:

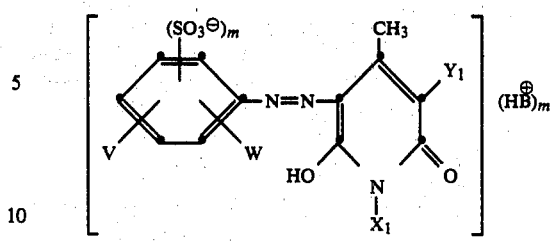

or of a tautomer thereof, wherein V is hydrogen, W is hydrogen, methyl or alkoxy of 1 to 4 carbon atoms; $X_1$ is hydrogen, alkyl of 1 to 18 carbon atoms; hydroxyalkyl of 1 to 18 carbon atoms; alkoxyalkyl of 1 to 18 carbon atoms; cyanoalkyl of 1 to 18 carbon atoms; cycloalkyl of 6 to 10 carbon atoms; aralkyl of 7 to 10 carbon atoms; phenyl; or phenyl substituted by halogen, alkyl of 1 to 6 carbon atoms or alkoxy of 1 to 6 carbon atoms; $Y_1$ is cyano or $CONH_2$, $HB^\oplus$ is a radical of the formulae:

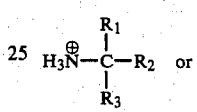

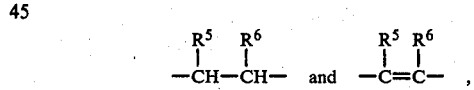

in which $R_1$, $R_2$ and $R_3$ are together alkyl of 7 to 24 carbon atoms, each of $R^1$ and $R^3$ independently represents hydrogen or a straight chain or branched alkyl radical of 1 to 8 carbon atoms, $R^2$ represents a straight chain or branched alkyl radical of 1 to 8 carbon atoms and $R^4$ represents a straight chain or branched alkyl radical of 1 to 18 carbon atoms, or $R^1$ and $R^2$; $R^3$ and $R^4$; or both $R^1$ and $R^2$, and $R^3$ and $R^4$ together with the carbon atom to which they are attached form a cycloaliphatic ring containing 4 to 8 carbon atoms, and wherein each E represents one of the radicals;

$$\begin{matrix} R^5 & R^6 \\ | & | \\ -CH-CH- \end{matrix} \quad \text{and} \quad \begin{matrix} R^5 & R^6 \\ | & | \\ -C=C- \end{matrix} ,$$

in which each of $R^5$ and $R^6$ independently is hydrogen or alkyl of 1 to 4 carbon atoms, $R^7$ is a straight chain or branched alkyl containing altogether 1 to 18 carbon atoms; and m is 1 or 2.

2. An azo dyestuff salt according to claim 1 of the formula

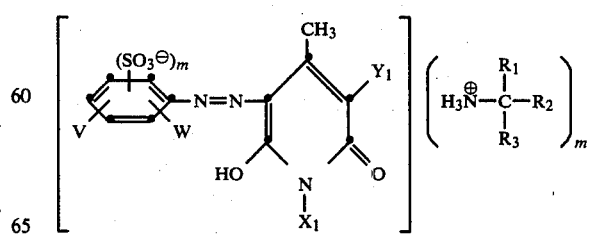

wherein $R_1$, $R_2$, $R_3$, V, W, $X_1$, $Y_1$ and m have the meaning given in claim 1.

3. An azo dyestuff salt according to claim 1, wherein $X_1$ is alkyl of 1 to 4 carbon atoms and $Y_1$ is cyano.

4. The azo dyestuff salt according to claim 1 of the formula:

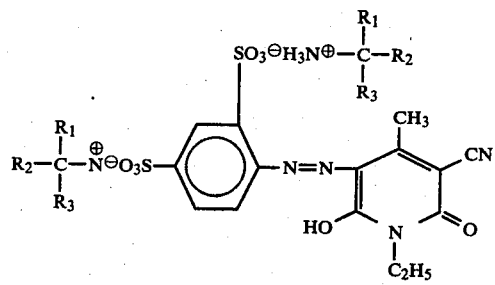

wherein $R_1$, $R_2$ and $R_3$ are alkyl containing together 12–14 carbon atoms.

5. The azo dyestuff salt according to claim 1 of the formula:

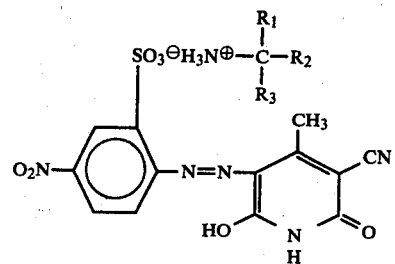

wherein $R_1$, $R_2$ and $R_3$ are alkyl containing together 18–22 carbon atoms.

6. The azo dyestuff salt according to claim 1 of the formula:

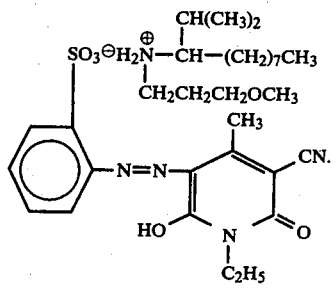

* * * * *